Sept. 9, 1958  R. E. STECK  2,851,572
HEATING UNIT
Filed May 13, 1957

Inventor
RUDOLPH EDWARD STECK
by: Gary, Desmond & Parker
Attys.

United States Patent Office 2,851,572
Patented Sept. 9, 1958

2,851,572

HEATING UNIT

Rudolph Edward Steck, Stratford, Conn., assignor to Raybestos-Manhattan, Inc., Passaic, N. J., a corporation of New Jersey Application May 13, 1957, Serial No. 658,859

9 Claims. (Cl. 201—67)

This invention relates to electric heating units, and particularly to unitary assemblies which may be used as hot plates per se, or as hot plate components for devices such as coffee makers and the like.

It is a particular object of the present invention to provide heating elements of improved heat conductivity, improved heat distributional characteristics, and longer life as compared to bare-faced heating elements, and the elimination of burn-outs due to local hot spots which have occurred in devices of the prior art formed with or from heating elements of the class herein contemplated.

Thus, it is also an object of the present invention to improve the efficiency in utilization of heat-generating elements of the type composed of a coiled resistance wire embedded in a ceramic material and enclosed in a tubular metal sheath generally known as Calrod units or heating elements.

It is a further object of the present invention to provide an improved heating surface of novel character and composed of a sintered powdered metal plate or disc with the aforesaid tubular metal sheathed electrical heating element partially embedded therein, and characterized by the autogenous welding of the Calrod unit to the disc under sintering heat and pressure to provide a metallurgical bond between the two elements of the assembly, at a temperature below the melting point of the tubular sheath.

The foregoing is to be distinguished from mere embedding of a Calrod heating element in a metal plate, as for example by casting the metal thereabout or otherwise to form a mechanical interlock.

Thus, heating elements of the aforesaid class can burn out due to local hot spots caused by, for example, air space in the insulation or by poor local contact of the heating tube to the disc or plate to which it may be engaged. In casting a plate about a coiled Calrod element, blow holes in the metal adjacent to the element can result in the development of local hot spots.

It is an object of the present invention to substantially completely eliminate the possibility of blow holes, the bonding of the components in accordance with the present invention substantially eliminating the possibility of poor contact. As a result there is improved flow of heat away from the localized area of the Calrod into the greater area of the metallic disc to which it is bonded.

The foregoing and other objects of the invention, its arrangement of parts and method of construction will be apparent from a consideration of the following specification and accompany drawings, wherein.

Figure 1:
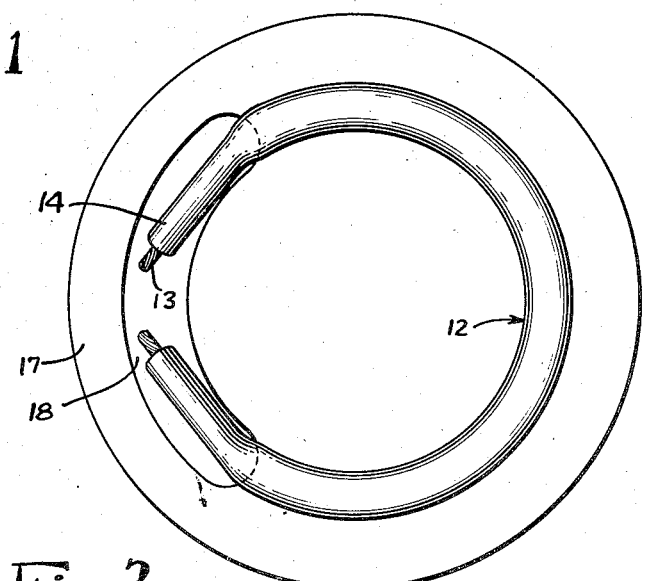
Fig. 1 is a plan view of a platen for seating and positioning a heating element coil of the Calrod type prior to bonding thereof to a sintered metal plate.
Figure 2:
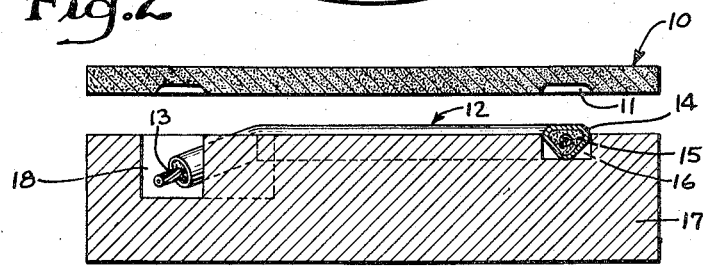
Fig. 2 is an exploded cross sectional view of the platen of Fig. 1 and a densified powdered metal preform to be joined to the heating element shown seated in the platen, by heat and pressure.

Referring to the drawings, the reference numeral 10 generally indicates a powdered metal preform for forming a heating plate or disc which, in accordance with the present invention, should contain at least 10% by weight of copper and the remainder generally iron, although it may be composed of substantially 100% of copper.

It will be understood, however, that the powdered metal composition may contain minor amounts of metals other than iron and copper, such as lead or tin, with or without lubricants such as graphite or powdered waxes and with or without dilution agents such as powdered silica or other nonmetallic minerals.

A typical formula is composed of 49.75% by weight each of copper powder and iron powder, and 0.5% by weight of a material such as Sterotex which is a waxlike powder conventionally used in powdered metallurgy as a mold lubricant. These constituents are mixed in a blender of the Reed mixer type until the blend is uniform, after which it is molded in a hardened steel die at from about 10 to 30 tons per square inch pressure, the circular groove 11 being molded into the compact at the same time for the purpose of locating and seating the heating element in the sintering operation.

It will be understood that although the form of platen illustrated shows a single circular groove for seating and aligning a single coil heating element 12, other arrangements may be employed, so that, for example, the groove 11 may be helical, or it may be in the form of two concentric, arcuate grooves connected to each other so as to receive a doubled length or coil of Calrod, i. e., initially bent to U-form and then coiled, or other arrangement.

Further, although not illustrated, it will be understood that the preform 10 although shown to be in the form of a solid disc may be formed with axial aperture so as to receive therethrough or therein a button switch to be actuated when an article to be heated is placed on the assembly.

The heating elements 12 as previously indicated are of generally conventional Calrod construction, that is, they are composed of a core of spiral wound resistance wire 13, a spaced outer metallic sheath 14 which may be of triangular or circular cross section, and ceramic insulating powder 15 therebetween which usually is of a material such as "Magnorite," a magnesium oxide refractory composition.

Prior to bonding the two components the Calrod sheath, after protecting exposed ends, is pickled in acid to obtain chemical cleanliness, neutralized and rinsed, and then copper-plated by conventional practices to obtain a copper plate thickness in the range, for example, from a minimum of .0003 to about .0006 inch, the metal sheath 14 being copper plated in order to obtain a true metallurgical bond in the subsequent sintering operation. In order that this may be effectively and efficiently accomplished, it is preferred that the sheets 14 be composed of metal such as low carbon steel, rather than a material such as stainless steel which is not always amenable to copper plating and therefore does not form the type of bond necessary to the accomplishment of the full objects of the present invention. Although a tubing with low carbon steel will melt at casting temperatures of molten iron when it is attempted to cast such a heating element thereabout, the practices of the present invention permit the avoidance of temperatures which might melt or otherwise deleteriously affect the low-carbon steel sheath 14.

In consolidating the assembly, the Calrod unit 12 is seated in the groove 16 of the platen 17 with the terminal ends, which remain separated, bent downwardly into the relatively deeper well section 18 in the platen 17.

In order to provide a successful and complete bond it is essential that the depth of the groove 16 be such that the element 12 projects thereabove to a height equal to the depth of the groove 11 in the molded powdered metal preform 10 and of course be of matching contour. Further, it is necessary to provide uniform pressure on the entire flat disc component 10 so that the density of the powdered metal at the heating element bond line therewith is the same density as the powdered metal adjacent to it, to avoid the formation of stress-relieving cracks that might otherwise occur at points where high and low density meet.

Sintering is accomplished in a suitable press at pressures from about 200 to 300 pounds per square inch in a heating cycle of rise, plus one hour at 1500° F., in a protective or reducing atmosphere, a suitable one being known as Exogas which is a cracked gas containing about 12% of hydrogen and the remainder carbon monoxide, carbon dioxide, and nitrogen.

Figure 3:
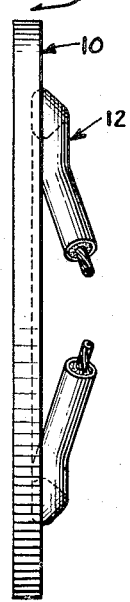
Fig. 3 is a peripheral or side edge elevational view of a heating element assembly of the present invention.
Figure 4:
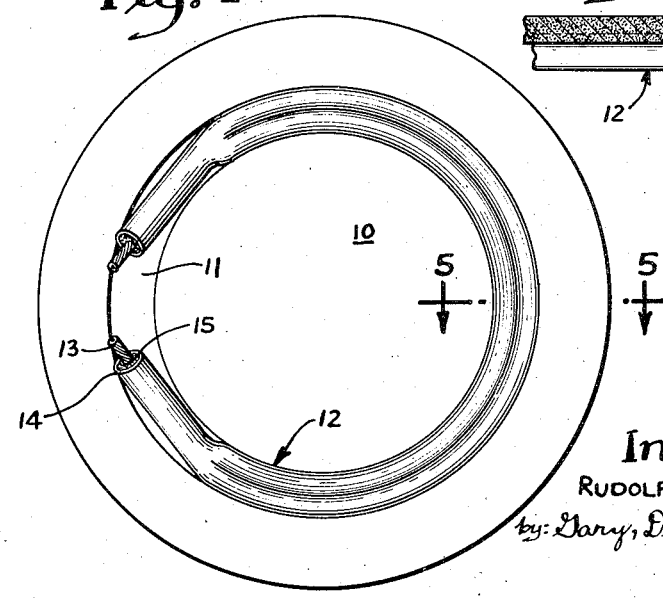
Fig. 4 is a bottom plan view thereof.
Figure 5:
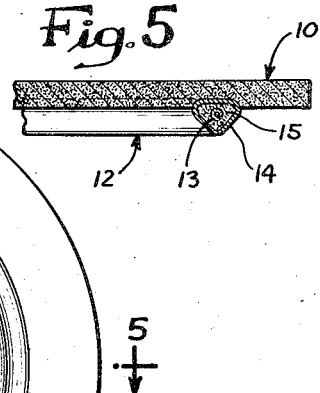
Fig. 5 is a fragmentary section on the line 5—5 of Fig. 4.

This results in a bond which is actually a metallurgical weld of the copper plating on the Calrod element 12 to the copper powder in the preform disc 10 to result in the firmly bonded assemblies shown in Figs. 3–5, the bond being greater than the tensile strength of the powdered metal structure, as evidenced by the fact that when attempts are made to separate the element 12 from the disc 10, portions of the plate 10 are torn out along with the element 12.

Although I have shown and described the preferred embodiments of my heating unit, it will be understood that modifications may be made in the details thereof without departing from the spirit of my invention.

I claim:

1. An electric heating unit comprising a copper-containing sintered metal plate and a heating element of the class comprising tubular metal sheathed and insulated resistance wire partially embedded in and metallurgically bonded to said plate.

2. An electric heating unit comprising a copper-containing sintered metal plate and a heating element of the class comprising tubular metal sheathed and insulated resistance wire partially embedded in and metallurgically bonded to said plate, said metal sheath being copper plated.

3. An electric heating unit comprising a copper-containing sintered metal plate and a heating element of the class comprising tubular metal sheathed and insulated resistance wire partially embedded in and metallurgically bonded to said plate, said metal sheath being composed of copper plated low carbon steel.

4. The heating unit of claim 3 wherein the sintered metal plate is composed of at least 10% by weight of copper powder.

5. The heating unit of claim 3 wherein the sintered metal plate is composed of substantially 100% by weight of copper powder.

6. The heating unit of claim 3 wherein the sintered metal plate is composed of at least 10% by weight of copper powder and the balance iron powder.

7. An electric heating plate comprising a copper-containing sintered metal disc and a tubular metal coil resistance heating element, said element being partially embedded in one face of said disc and in intimately metallurgically bonded engagement throughout the embedded area.

8. The method of forming an electrical heating unit which comprises seating a copper plated tubular metal heating element within a surface groove formed in a copper-containing densified powdered metal disc, and metallurgically bonding them together under sintering temperature and pressure.

9. The method of forming an electrical heating unit which comprises seating a copper plated tubular low carbon steel heating element within a surface groove of a densified, copper-containing, powdered metal disc preform, and metallurgically bonding them together under sintering pressure and temperature below the melting point of said tubular element.

References Cited in the file of this patent

UNITED STATES PATENTS

| | | |
|---|---|---|
| 2,468,409 | Reimers | Apr. 26, 1949 |
| 2,469,800 | Vogel | May 10, 1949 |
| 2,469,801 | Vogel | May 10, 1949 |